US009418257B2

(12) United States Patent
Wassingbo

(10) Patent No.: US 9,418,257 B2
(45) Date of Patent: Aug. 16, 2016

(54) OFFLINE MODE FOR TAG TRANSMISSION REPORTS

(71) Applicant: Sony Corporation, Tokyo (JP)

(72) Inventor: Tomas Wassingbo, Lund (SE)

(73) Assignee: Sony Corporation, Tokyo (JP)

( * ) Notice: Subject to any disclaimer, the term of this patent is extended or adjusted under 35 U.S.C. 154(b) by 101 days.

(21) Appl. No.: 14/299,636

(22) Filed: Jun. 9, 2014

(65) Prior Publication Data

US 2015/0356328 A1    Dec. 10, 2015

(51) Int. Cl.
G08B 21/00    (2006.01)
G06K 7/10    (2006.01)
H04W 4/00    (2009.01)
H04W 88/04    (2009.01)

(52) U.S. Cl.
CPC .......... *G06K 7/10009* (2013.01); *H04W 4/008* (2013.01); *H04W 88/04* (2013.01)

(58) Field of Classification Search
CPC ... G06K 7/10009; H04W 88/04; H04W 88/06
USPC ........................................ 340/10.1
See application file for complete search history.

(56) References Cited

U.S. PATENT DOCUMENTS

| | | | |
|---|---|---|---|
| 2006/0220879 A1* | 10/2006 | Chan ................ | G06K 17/0022 340/573.1 |
| 2010/0279647 A1 | 11/2010 | Jacobs et al. | |
| 2012/0268250 A1 | 10/2012 | Kaufman et al. | |
| 2013/0084835 A1* | 4/2013 | Scherzer ............... | H04W 48/14 455/414.1 |
| 2013/0157569 A1 | 6/2013 | Torvmark et al. | |
| 2013/0210360 A1 | 8/2013 | Ljung et al. | |
| 2014/0062699 A1 | 3/2014 | Heine et al. | |
| 2014/0086179 A1 | 3/2014 | Shi et al. | |

FOREIGN PATENT DOCUMENTS

EP    1 760 958 A2    3/2007

OTHER PUBLICATIONS

International Search Report and Written Opinion Corresponding to International Application No. PCT/JP2014/006162; Date of Mailing: Mar. 25, 2015; 12 Pages.

* cited by examiner

*Primary Examiner* — Mark Rushing
(74) *Attorney, Agent, or Firm* — Myers Bigel & Sibley, P.A.

(57) ABSTRACT

Methods and systems for forwarding tag transmission reports are provided. A mobile device may receive a wireless transmission from a tag and store data received from the tag, a location of the mobile communication terminal and a timestamp of the wireless transmission. The storing may be performed while the mobile device is in an application offline mode with respect to communication with a server that receives the data, location and timestamp. Tag data, the location and the timestamp may be sent in a tag transmission report to another computing device responsive to a determination by the mobile device that the other computing device is in an application online mode capable of presently communication with the server. The online computing device may send the tag transmission report from the offline mobile device to the server.

20 Claims, 9 Drawing Sheets

OFFLINE MODE FOR TAG TRANSMISSION REPORTS

FIELD

Embodiments of this invention relate to tags and tag readers.

BACKGROUND

Radio Frequency Identification (RFID) tags may be embedded in or attached to items that can store identification information and other details. Tags may be small devices, such as a label, with a miniature embedded antenna. A tag reader may interrogate the tag by transmitting an RFID signal, which energizes the embedded antenna to provide power for the tag to transmit a responsive RFID signal to the reader. Some tags may have a power source and/or circuitry to provide transmissions or broadcasts to be picked up by tag readers. Tag readers may be mobile communication terminals.

Tag readers may receive transmissions from tags and report the tag transmissions to a server in a network cloud. However, users may have second thoughts about uncontrolled data communication with the cloud. Such users may be reluctant to give tag reporting applications full access to communication over the mobile network.

SUMMARY

According to some embodiments of the present invention, a mobile communication terminal may include a processor, a communication interface coupled to the processor, a memory coupled to the processor and comprising computer readable program code embodied in the memory that when executed by the processor causes the processor to perform operations. The operations may include receiving a wireless transmission from a tag and storing data received from the tag, a geographical location of the mobile communication terminal and a timestamp of the wireless transmission. The storing may be performed while the mobile communication terminal is in an application offline mode with respect to communication with a server that receives the data, location and timestamp. The operations may further include sending the data, the location and the timestamp in a tag transmission report to another computing device responsive to a determination that the other computing device is in an application online mode capable of presently communicating with the server. The sending may be performed while the mobile communication terminal is in an application offline mode.

According to some embodiments, the application offline mode may include preventing or halting the sending of tag transmission reports to the server. Application offline mode may include a status during which tag transmission data or tag transmission reports are not sent to the server. Application offline mode may include halting application communication with the server through cellular and wide area networks (WAN). Application communication may include communication specific to an application that shares or receives tag transmission data. Application offline mode may include continuing application communication with other computing devices through local area networks (LAN), Wi-Fi, Bluetooth® protocols, near field communication (NFC) or any other low energy or short range protocols.

According to some embodiments, while operating in the application offline mode, the mobile communication terminal may not be capable of sending the tag transmission report to the server through cellular and/or wide area networks (WAN).

While operating in the application offline mode, the mobile communication terminal may prevent application communication with the server through cellular and/or wide area networks (WAN). The application offline mode may include continuing application communication with other computing devices through at least one of local area networks (LAN), Wi-Fi, Bluetooth® protocols and near field communication (NFC).

According to some embodiments, the operations may further include broadcasting a notification transmission indicating that the mobile communication terminal has the tag transmission report to send to another computing device that is in the application online mode.

According to some embodiments, the operations may further include listening for a broadcast transmission from another computing device indicating that the other computing device is in the application online mode and, responsive to receiving the broadcast transmission, sending the tag transmission report to the other computing device.

According to some embodiments, the other computing device may be a first other computing device, and the operations may further include sending the data and the timestamp in another tag transmission report to a second other computing device responsive to a determination that the second other computing device is in the application online mode with respect to the server. The operations may further include establishing a counter value associated with the data and the timestamp responsive to sending the tag transmission report, changing the counter value responsive to sending the other tag transmission report and, responsive to the counter value satisfying a counter threshold, preventing the sending of the tag transmission report or the other tag transmission report to the server.

According to some embodiments, the operations may include storing a geographical location of the mobile communication terminal responsive to receiving the wireless transmission from the tag and sending the geographical location in the tag transmission report to the other computing device.

According to some embodiments, the operations may include overwriting the timestamp with a new timestamp responsive to receiving another wireless transmission from the tag comprising the data at the geographical location.

According to some embodiments, the operations may include performing at least one of deleting the data and sending the tag transmission report to the server responsive to a determination that a storage time of the data satisfies an expiration threshold.

According to some embodiments, a method may include receiving a wireless transmission from a tag and storing data received from the tag, a location of the mobile communication terminal and a timestamp of the wireless transmission. The storing may be performed while the mobile communication terminal is in an application offline mode with respect to communication with a server that receives the data, location and timestamp. The method may further include sending the data, the location and the timestamp in a tag transmission report to another computing device responsive to a determination that the other computing device is in an application online mode capable of presently communicating with the server. The sending may be performed while the mobile communication terminal is in an application offline mode.

According to some embodiments, the application offline mode may include halting the sending of tag transmission reports to the server. Application offline mode may include a status during which tag transmission reports are not sent to the server. Application offline mode may include halting application communication with the server through cellular and WANs. Application offline mode may include continuing application communication with other computing devices through local area networks, Wi-Fi, Bluetooth® protocols, NFC or any other low energy or short range protocols.

According to some embodiments, while operating in the application offline mode, the mobile communication terminal may not be capable of sending the tag transmission report to the server through cellular and/or wide area networks (WAN). While operating in the application offline mode, the mobile communication terminal may prevent application communication with the server through cellular and/or wide area networks (WAN). The application offline mode may include continuing application communication with other computing devices through at least one of local area networks (LAN), Wi-Fi, Bluetooth® protocols and near field communication (NFC).

According to some embodiments, the method may include broadcasting a notification transmission indicating that the mobile communication terminal has the tag transmission report to send to another computing device that is in the application online mode.

According to some embodiments, the method may include listening for a broadcast transmission from another computing device indicating that the other computing device is in the application online mode and, responsive to receiving the broadcast transmission, sending the tag transmission report to the other computing device.

According to some embodiments, the other computing device may be a first other computing device, and the method may further include sending the data and the timestamp in another tag transmission report to a second other computing device responsive to a determination that the second other computing device is in the application online mode with respect to the server. The method may further include establishing a counter value associated with the data and the timestamp responsive to sending the tag transmission report, changing the counter value responsive to sending the other tag transmission report and, responsive to the counter value satisfying a counter threshold, preventing the sending of the tag transmission report or the other tag transmission report to the server.

According to some embodiments, the method may include storing a geographical location of the mobile communication terminal responsive to receiving the wireless transmission from the tag and sending the geographical location in the tag transmission report to the other computing device.

According to some embodiments, the method may include overwriting the timestamp with a new timestamp responsive to receiving another wireless transmission from the tag comprising the data at the geographical location.

According to some embodiments, the method may include performing at least one of deleting the data and sending the tag transmission report to the server responsive to a determination that a storage time of the data satisfies an expiration threshold.

According to some embodiments, a computing device, such as a mobile communication terminal or a stationary computing device, includes a processor, a communication interface coupled to the processor and a memory coupled to the processor and comprising computer readable program code embodied in the memory that when executed by the processor causes the processor to perform operations. The operations may include sending a transmission, such as an online notification, indicating that the computing device is in an application online mode with respect to communication with a server and receiving a transmission, such as an offline notification, from another computing device indicating that the other computing device is in an application offline mode with respect to communication with the server. The offline notification may be a first message, a broadcast or a response message. The operations may further include receiving a tag transmission report from the other computing device. The tag transmission report may include data received in a wireless transmission from a tag, a location of the other computing device and a timestamp of the wireless transmission. The operations may also include sending the tag transmission report to the server.

According to some embodiments, the operations may include sending a confirmation message to the other computing device responsive to receiving the tag transmission report from the other computing device. The operations may further include sending another confirmation message to the other computing device responsive to sending the tag transmission report to the server.

Other devices, methods, and/or computer program products according to embodiments of the invention will be or become apparent to one with skill in the art upon review of the following drawings and detailed description. It is intended that all such additional devices, methods, and/or computer program products be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the invention and are incorporated in and constitute a part of this application, illustrate certain embodiment(s) of the invention.

DETAILED DESCRIPTION

Figure 1:
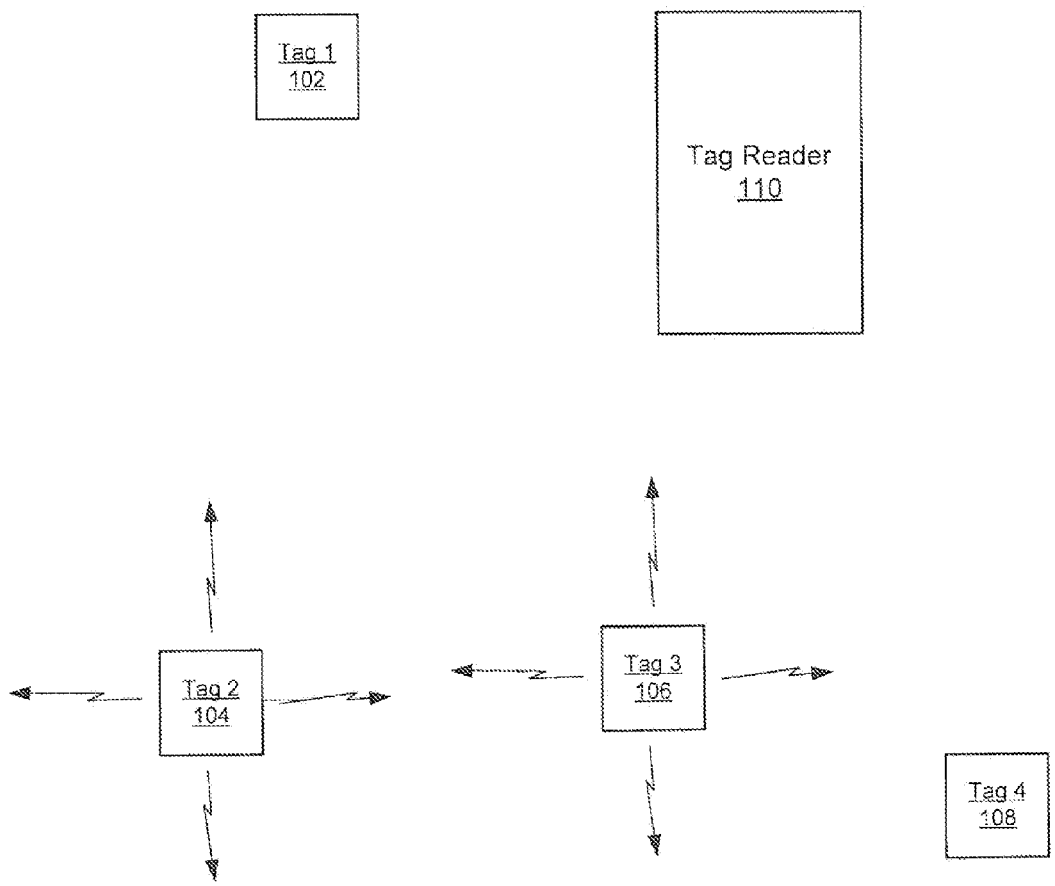
FIG. 1 is a schematic illustration of a tag reader receiving tag transmissions.

Various embodiments of the present invention will now be described more fully hereinafter with reference to the accompanying drawings. However, this invention should not be construed as limited to the embodiments set forth herein. Rather, these embodiments are provided so that this disclosure will be thorough and complete, and will convey the scope of the invention to those skilled in the art.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. The term "and/or" and "/" includes any and all combinations of one or more of the associated listed items. In the drawings, the size and relative sizes of regions may be exaggerated for clarity. Like numbers refer to like elements throughout.

Some embodiments may be embodied in hardware and/or in software (including firmware, resident software, microcode, etc.). Consequently, as used herein, the term "signal" may take the form of a continuous waveform and/or discrete value(s), such as digital value(s) in a memory or register. Furthermore, various embodiments may take the form of a computer program product on a computer-usable or computer-readable storage medium having computer-usable or computer-readable program code embodied in the medium for use by or in connection with an instruction execution system. Accordingly, as used herein, the terms "module," "circuit" and "controller" may take the form of digital circuitry, such as computer-readable program code executed by an instruction processing device(s) (e.g., general purpose microprocessor and/or digital signal processor), and/or analog circuitry.

Embodiments are described below with reference to block diagrams and operational flow charts. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Tag readers may receive transmissions from tags and report the tag transmissions to a server in the cloud. However, users may have second thoughts about uncontrolled data communication with the cloud. Such users may be reluctant to give tag reporting applications full access to communication over the mobile network. Embodiments described herein provide for mobile devices not in communication with an application server, or not providing mobile network access to an application on the mobile device, to send tag transmission information to other devices that are in communication with the application server. The online devices can then forward the tag transmission information to the application server.

Tags may be used to track items or people for commercial or personal purposes. The tags may be attached to moveable objects and may be any shape or size that can be incorporated into or on the moveable objects. Moveable objects can include, without limitation, wallets, keys, bikes, bags, mobile telephones, clothing, automobiles or other moveable items. Tags may include devices, labels or printed inks on paper.

FIG. 1 illustrates a schematic diagram of tags 102-108 that may transmit wireless signals or broadcasts. Tags may transmit wireless signals, such as broadcasts with tag ID information. Many types of tags may lack a power source and transmit a tag ID as an inductive response to a received signal from tag reader 110. Other tags may have a power source and/or include additional circuitry for receiving signals and processing commands. For example, FIGS. 2A-2C are block diagrams illustrating a tag 200.

Figure 2A:
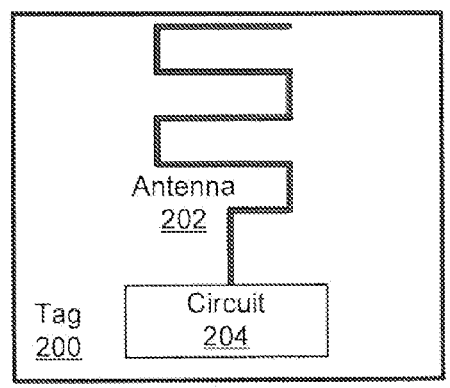
FIGS. 2A-2C are schematic block diagrams that illustrate tags, according to some embodiments.

FIG. 2A illustrates a block diagram of a simple tag that has an embedded antenna 202 that receives a tag reader signal that energizes tag 200 so that it may have power to transmit a responsive RFID signal to the tag reader. Such a tag may also include a circuit 204 for transmitting a tag ID. For example, circuit 204 may include an NFC circuit (accessory NFC circuit) that can be powered by and communicate with a UE NFC circuit using short-range high frequency wireless communication technology which enables the exchange of data between devices over about a 10 cm distance, although the NFC circuits are not limited to operating in at any defined range. The NFC circuits may communicate via magnetic field induction.

Figure 2B:
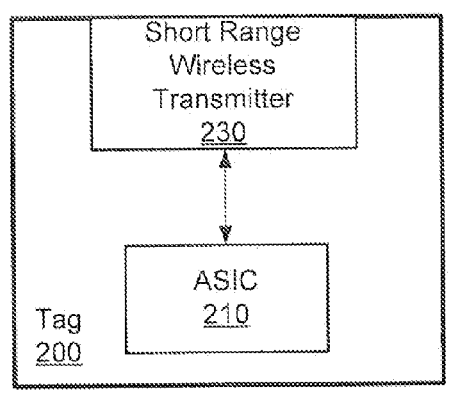

As illustrated in FIG. 2B, tag 200 may include a short-range wireless transmitter 230. Transmitter 230 may include a transmitter circuit to transmit radio frequency communication signals via an antenna system. Transmitter 230 may also include a transceiver circuit that is operative to also receive communication signals. Transmitter 230 may transmit and/or receive signals according to one or more wireless communication protocols, such as Bluetooth® protocols, ANT protocols, WLAN protocols (e.g., 802.11a, 802.11b, 802.11e, 802.11g, and/or 802.11i), or other wireless communication protocols. The transmitter 230 may be, for example, a low power Bluetooth® protocol transmitter or an ANT protocol transmitter, such as those designed and marketed by Dynastream Innovations Inc., a Cochrane, Canada based company. Tag 200 may include an Application Specific Integrated Circuit (ASIC) circuit 210 or an NFC circuit for transmitting a tag ID and/or for other logic operations.

Figure 2C:
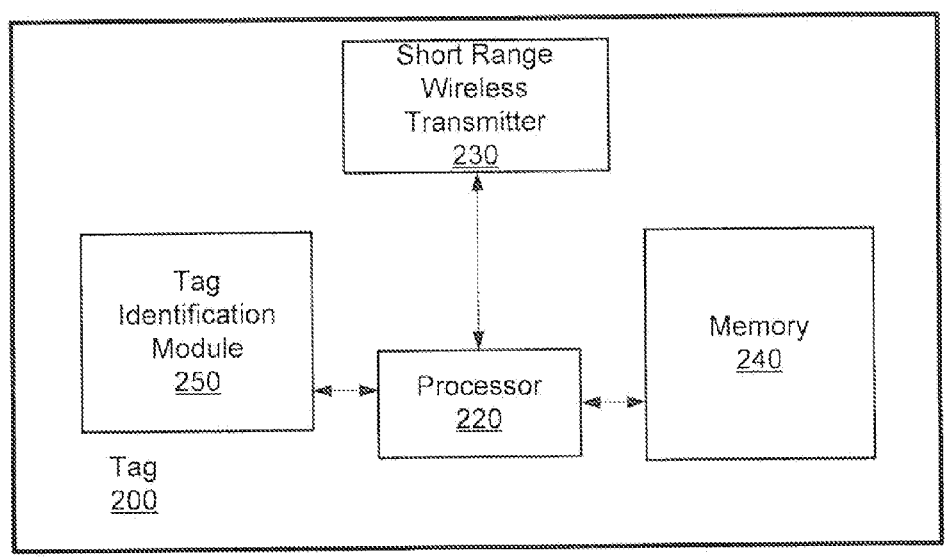

In some cases, as shown in FIG. 2C, tag 200 may also include a processor 220 that includes circuits for overall operation of the tag 200 including coordination of communications via transmitter 230. Processor circuit 220 may be configured to communicate data over the transmitter 230 according to one or more wireless communication protocols, such as Bluetooth® protocols, ANT protocols, WLAN protocols (e.g., 802.11a, 802.11b, 802.11e, 802.11g, and/or 802.11i), or other wireless communication protocols. The transmitter 230 may be, for example, a low power Bluetooth® protocol transmitter or an ANT protocol transmitter. The tag 200 of FIG. 2C may also have an NFC circuit.

Tag 200 may also include a tag identification module 250 that operates with memory 240 to store identification information, such as a unique tag ID. The tag ID may also uniquely identify a moveable object attached to the tag. For example, two different moveable objects can have respective tags that each store different ID information that can be used to distinguish the two moveable objects. In some cases, tag 200 may have a power source or may be connected to a power source.

As shown in FIG. 1, a tag reader 110, may receive any wireless broadcast transmissions from one or more of tags 102-108. In some embodiments, tag reader 110 may be a mobile communication terminal, such as mobile terminal 300 in FIG. 3. A mobile communication terminal may be, for example, a smart phone, Personal Data Assistant (PDA), laptop, tablet, scanner or any other mobile computing device that may have capabilities including cellular telecommunication, Internet/intranet access, and/or a global positioning system (GPS) service. The mobile communication terminal may also support Wi-Fi communication over a local wireless network.

Figure 3:
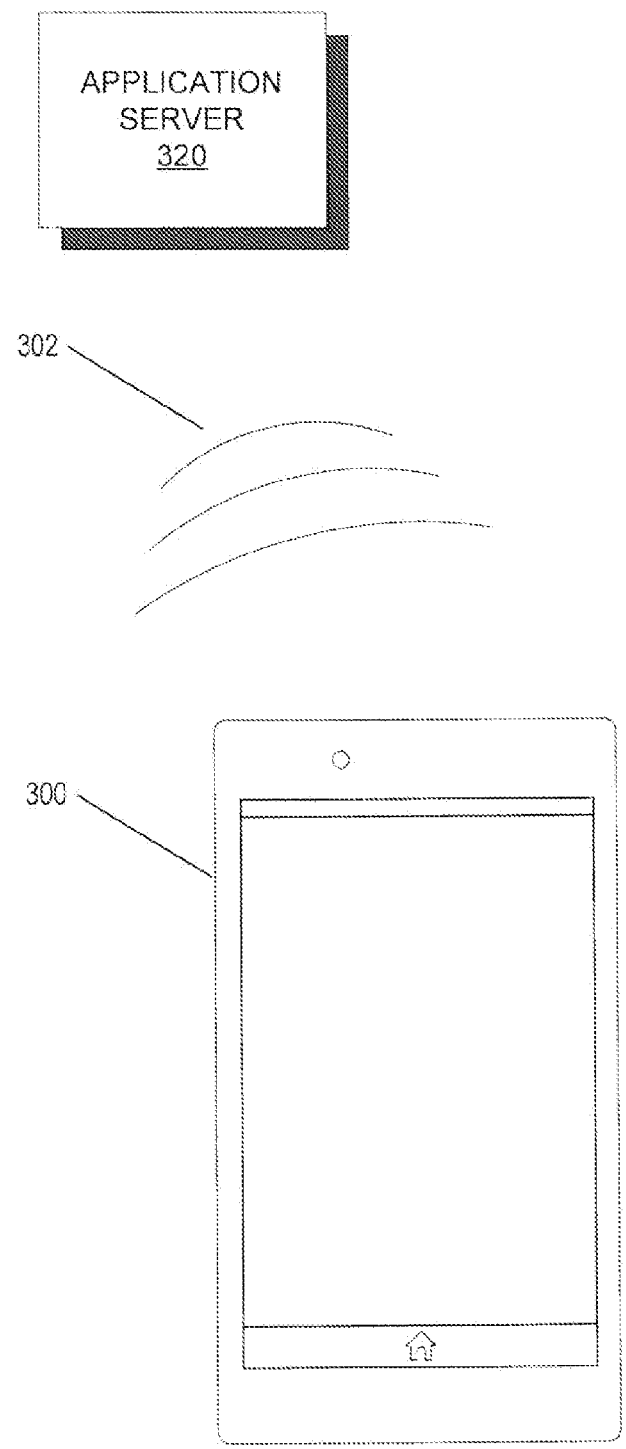
FIG. 3 is a schematic illustration of a tag reader sending a tag transmission report to a server, according to some embodiments.

Referring to FIG. 3, mobile terminal 300 may format and/or communicate the received tag transmissions to another computer, such as application server 320, over a network commonly employed to provide voice and data communications to subscribers. The transmissions may be included in a tag transmission report 302. According to some embodiments, one or more tag IDs may be transmitted once or a number of times. The tag transmission report may be a single transmission to application server 320 or a number of transmissions to server 120 over a period of time. A tag transmission report may include one or more tag IDs. According to some embodiments, tag reader 110 may determine geographical location information (or have location information determined), using for example GPS or a network assisted location service. The location information may be included in tag transmission report 302 and associated with the tag IDs in the tag transmission report. As the location information is periodically determined, it can be used to update the location information for the moveable objects. The location information can also include a time and/or history for each location of the moveable object.

Figure 4:
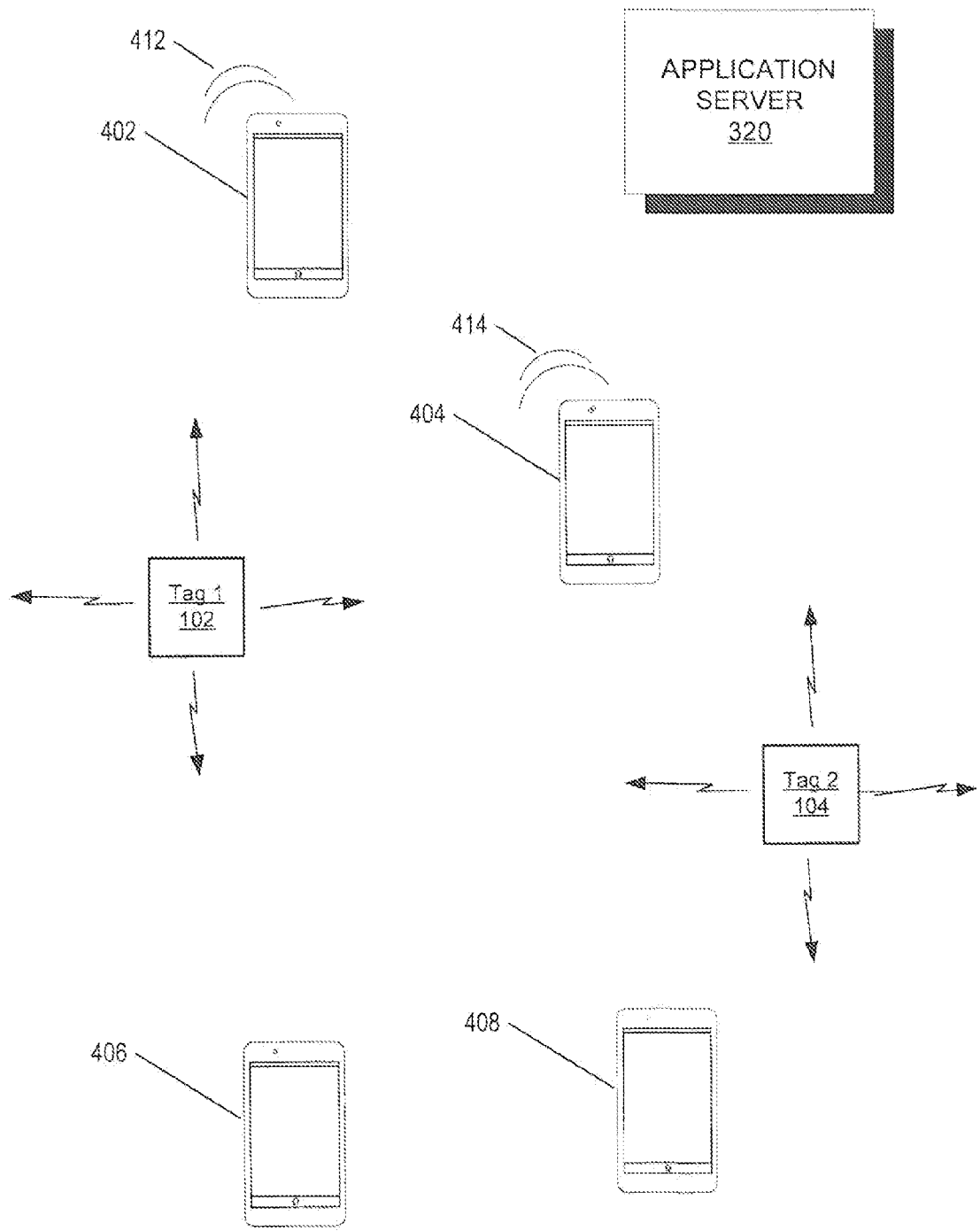
FIG. 4 is a schematic block diagram that illustrates mobile devices in an application online mode and mobile devices in an application offline mode, according to some embodiments.

Mobile devices may forward tag transmission reports of wireless transmission of tags to a cloud server. However, for various privacy, security and cost reasons, some owners may allow their mobile devices to read tag transmissions, but do not want their mobile devices sending the tag transmission reports to the cloud server over the mobile network, or the cellular or WAN networks. Therefore, embodiments described herein may allow these mobile devices to operate in an application offline mode. For example, FIG. 4 shows online and offline mobile devices, according to some embodiments. Online mobile devices 402 and 404 are in communication with application server 320. That is, they regularly or asynchronously transmit tag transmission reports 412 and 414 to application server 320. However, offline mobile devices 406 and 408 have a tag location application that is currently not in communication with the corresponding application server over the cellular or WAN networks. Offline mobile device 406 and 408 do not send tag transmission reports to application server 320 while in application offline mode.

Tag transmission reports may be passed from offline mobile devices to online mobile devices that come near the offline mobile devices. These tag transmission reports or messages containing tag data can be sent from offline mobile devices to online mobile devices through local area networks or other short range or low energy protocols. The online mobile device may then forward the tag transmission report received from the offline mobile devices to the cloud server, such as application server 320.

Figure 6:
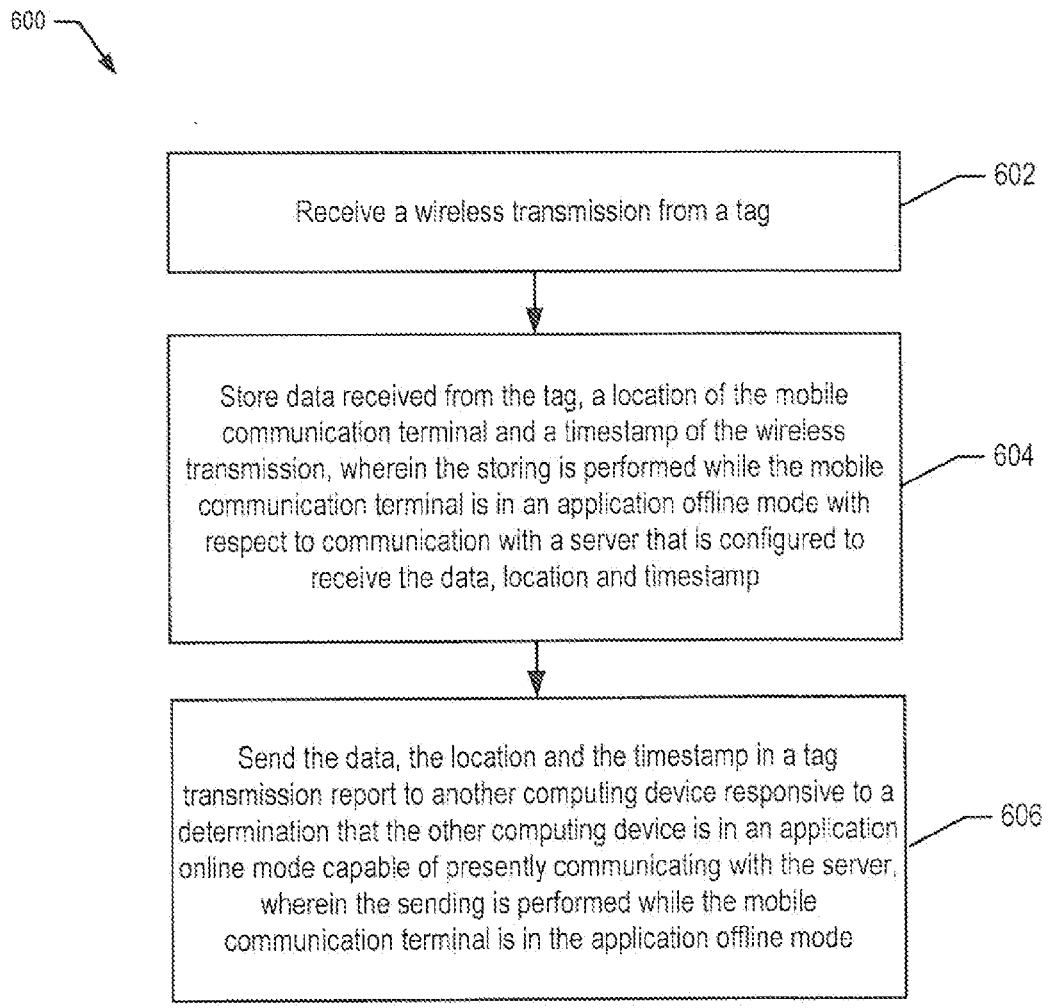
FIGS. 6-7 are flowcharts that illustrate operations of methods for forwarding tag transmission reports, according to some embodiments.
Figure 7:
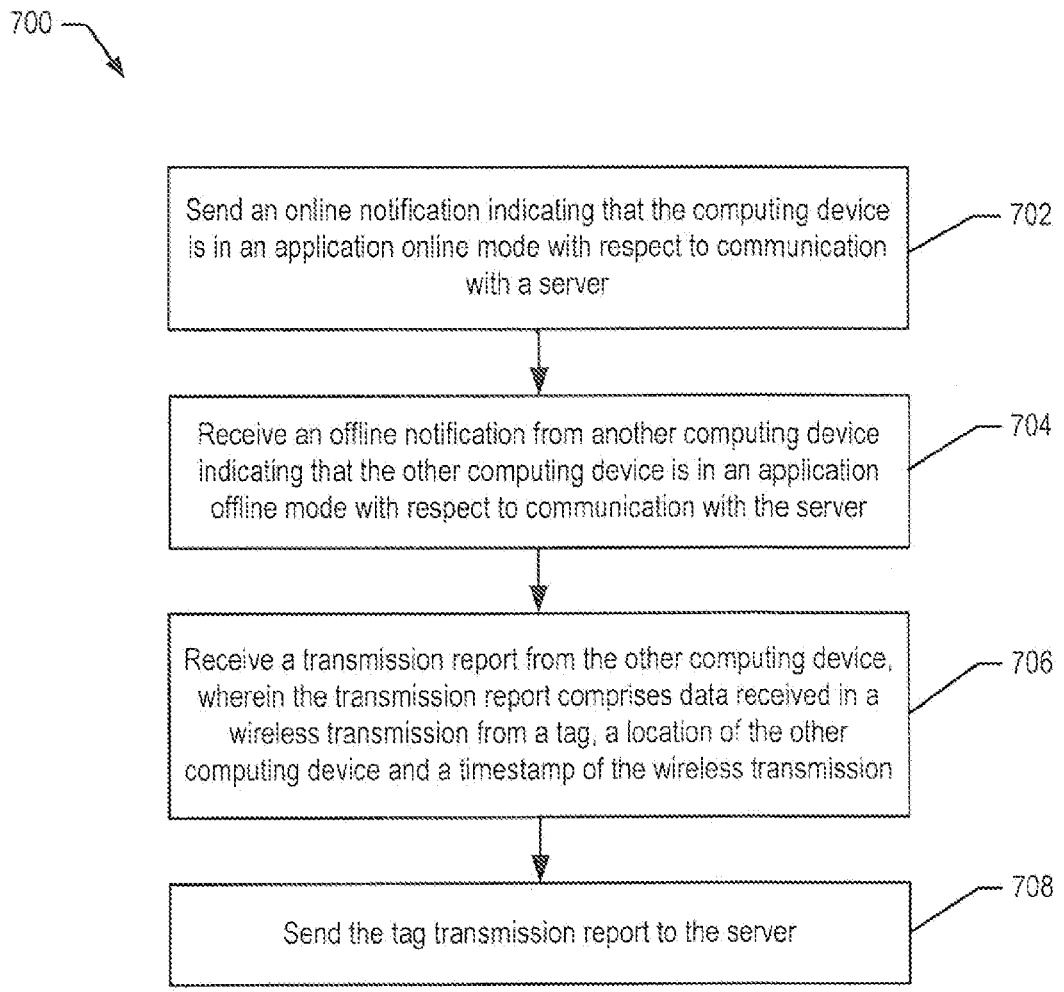

FIGS. 5A-5D illustrate an online mobile device forwarding tag transmission report data of an offline mobile device to application server 320, according to some embodiments. FIGS. 6 and 7 illustrate flowcharts 600 and 700 that show operations for forwarding tag transmission reports from viewpoints of an offline mobile device and an online mobile device, respectively, and will be discussed in combination with FIGS. 5A-5D.

At block 602 of FIG. 6, offline mobile device 406 receives a wireless transmission of data from a tag. At block 604, data received from the tag, such as a tag identification (ID), sensor information or other tag data may be stored in offline mobile device 406. A timestamp of the wireless transmission and a location stamp of the geographical location of offline mobile device 406 may also be stored in offline mobile device 406. In some cases, the amount of data may be very little and the storage of offline mobile device 406 may include a number of bits for ID/information, geographical location or position and time for the information.

When referring to offline mobile device 406, according to some embodiments, offline mobile device 406 may be offline only for mobile network access over a cellular or WAN network for a specific tag tracking application. Offline mobile device 406 may be online for other applications and/or for general data and phone service. In some cases, offline mobile device 406 may still be online for the specific application as to local area networks, Wi-Fi, Bluetooth® protocols, or any other low energy or short range communication. Likewise, online mobile device 502 refers to being online over any communication means for the specific tag tracking application.

Figure 5A:
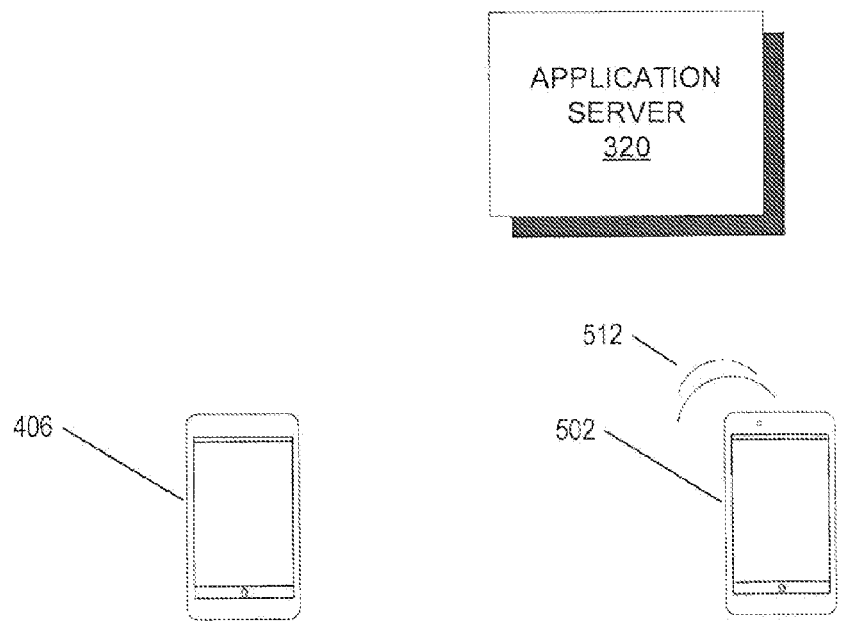
FIGS. 5A-5D are schematic illustrations of a mobile device in application online mode forwarding a tag transmission report from a mobile device in an application offline mode, according to some embodiments.
Figure 5B:
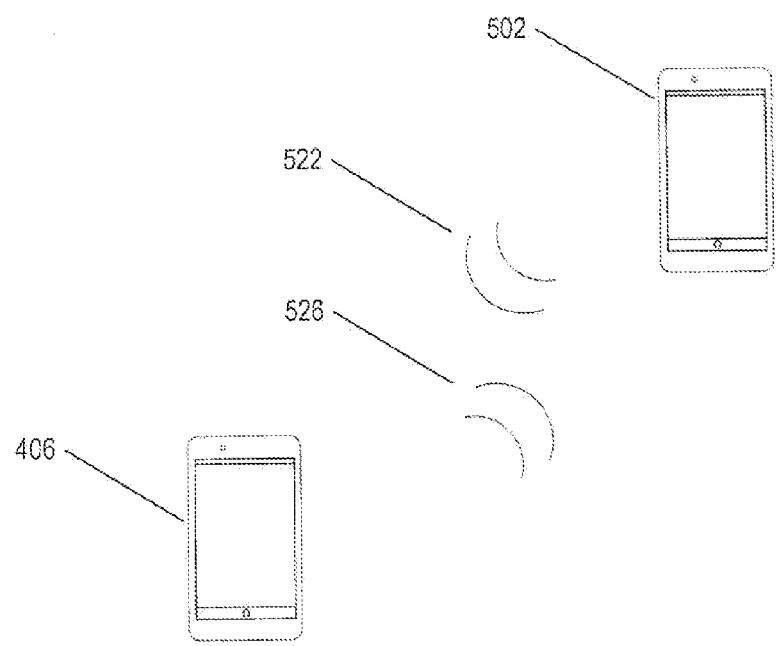

As shown in Figure 5A, offline mobile device 406 is approaching online mobile device 502 that has an online application status such that it transmits tag transmission reports 512 to application server 320. In some cases, as shown in FIG. 5B, offline mobile device 406 may broadcast a notification or message 526 over a short range protocol, such as a Bluetooth® protocol, indicating that it has tag transmission data it wishes to pass on to an online mobile device. Likewise, the online mobile device 502 may be listening for such broadcasts. Online mobile device 502 may also send notifications, broadcasts or transmissions 522 indicating that the online mobile is in an online application mode (FIG. 7 block 702). Online mobile device 502 may also receive a response from offline mobile device 406 indicating mobile device 406 is in application offline mode (block 704). Message 526 may also indicate such a response.

Figure 5C:
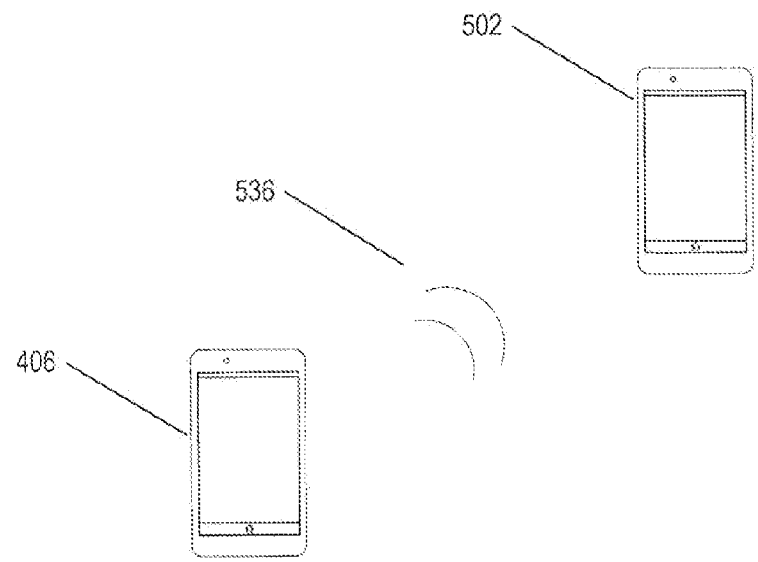

If offline mobile device 406 determines that online mobile device 502 is in an application online mode, perhaps based on message 522, then offline mobile device 406 sends tag transmission report data in a message 536 or tag transmission report to online mobile device 502, as shown in FIG. 5C and block 606 of FIG. 6. The storing and sending may be performed while offline mobile device 406 is in an application offline mode.

At block 706 of FIG. 7, the tag transmission report of message 536 from offline mobile device 406 is received. The tag transmission report may include the data received in a wireless transmission from the tag, the geographical location of offline mobile device 406 (perhaps where it received the wireless transmission from the tag) and the timestamp of when the wireless transmission was received by offline mobile device 406.

Figure 5D:
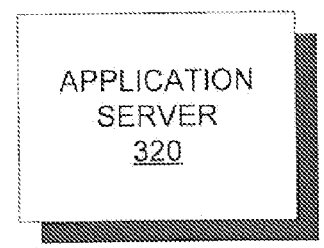
Figure 5D:
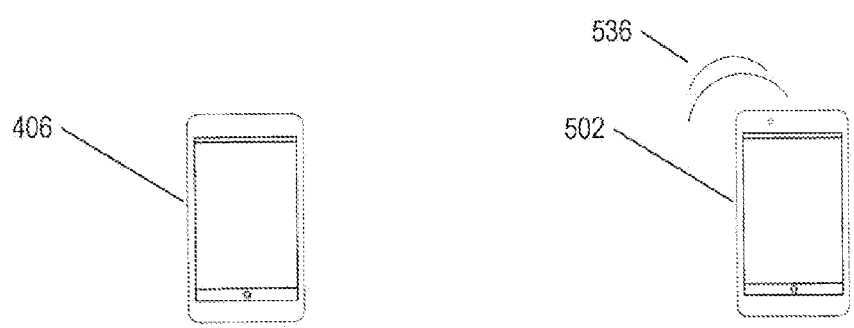

This tag transmission report 536, or the described information in tag transmission report 536, is sent to application server 320 (block 708), as shown in FIG. 5D. In some embodiments, online mobile device 502 may merely forward tag transmission report 536 received from offline mobile device 406. In other embodiments, information from tag transmission report 536 from offline mobile device 406 is reformatted before being forwarded to application server 320. Sometimes, only pieces of tag transmission report 536 from offline mobile device 406 may be sent to the application server 320 by online mobile device 502.

In some cases, online mobile device 502 may send a confirmation message to offline mobile device 406. A confirmation message may indicate that the stored tag transmission data has been received by online mobile device 502. Another confirmation message may indicate that the stored tag transmission information was sent to application server 320.

In places where many people gather, such as buses, trains, shops, cinemas, theatres, elevators, malls, restaurants, bars, queues, sports events, schools classes, office environments, etc., tag data from offline mobile devices have a higher likelihood of finding and utilizing the services of an online mobile device. In some cases, such locations may also have fixed online computing devices that collect tag data from offline mobile devices that pass the online computing devices.

In some embodiments, picked up tag data may be stored for only a certain time on offline mobile device 406. In some cases, in response to a determination that the storage time of the data, or how long the data has been stored, satisfies an expiration threshold or a time metric, offline mobile device 406 may enter online application mode to transmit the tag transmission reports to application server 320. In other cases, in response to expiration of the timer, no transmissions are made to application server 320. Such a decision may be made to protect the privacy of the user of offline mobile device 406 while maintaining the integrity of the tag transmission data. Often, user privacy has a higher priority than other data collection priorities. In such a case, the data is discarded or deleted.

In other embodiments, the same information from offline mobile device 406 is offloaded to more than one online mobile device (e.g. five offloads) to ensure the tag data reaches application server 320. In such cases, there may be a counter maintained by offline mobile device 406 that limits how many times offline mobile device 406 offloads data to an online mobile device. The counter may operate for a certain period of time or may reset after a certain period of time. The counter will help to prevent an exponential or mushrooming amount of tag data from being spread through the network from a single offline mobile device.

For example, a counter value associated with the data and the timestamp may be established or generated responsive to sending the tag transmission report. The counter value may be changed (incremented or decremented) responsive to sending the other tag transmission report. The sending of the tag transmission report or the other tag transmission report to the server may be prevented responsive to the counter value satisfying a counter threshold. The counter threshold may be a value or metric set to a number of times a tag transmission report may be sent during a time period. The time period may be a few seconds, a few minutes or even a few days.

In some embodiments, offline mobile device 406 may overwrite stored tag transmission data in response to new data being read from the very same tag. Offline mobile device 406 may overwrite stored tag transmission data also in response to the same tag being at the same geographical location.

The "application offline mode" user may only have to accept that the mobile device may communicate with the application server 320 for an installed application via Bluetooth or WLAN, and not through full network access via cellular communications. This limited data sharing may give the user some comfort. This "application offline mode" may also be an alternative for an "application online mode" user when that user is roaming when visiting another country, or when there is no network access available.

Application server 320 may store, sort and analyze tag data received from online mobile device 502 and/or tag data received from offline mobile device 406 through online mobile devices. Application server 320 may have a memory that stores data structures for such information. Application server 320 may also have a memory that stores computer program instructions that, when executed by a processor circuit, executes or carries out the operations corresponding to those described above. The memory can be a volatile memory or a non-volatile memory, such as EEPROM (flash memory), that retains the stored data while power is removed from the memory.

Figure 8:
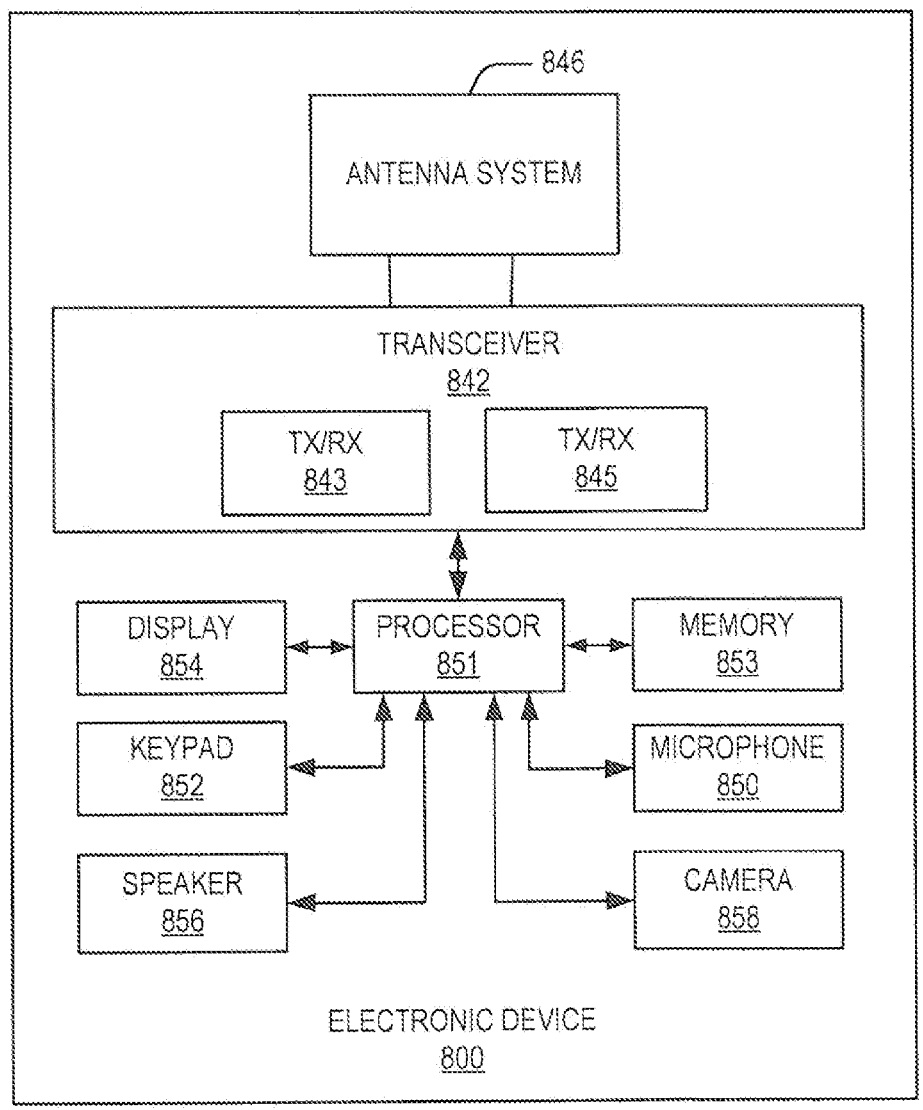
FIG. 8 is a block diagram illustrating a computing device for implementing some embodiments.

Online mobile devices, such as online mobile device 502, and offline mobile devices, such as offline mobile device 406, may include components as shown, for example, in FIG. 8. FIG. 8 is a schematic block diagram of an electronic device 800, according to various embodiments. The diagram of electronic device 800 is not limited to a mobile device. Stationary application online computing devices may also include such components as necessary.

Electronic device 800 may communicate using a communication interface over a wireline connection, the internet, and/or a wireless local network to connect to other devices. In some embodiments, electronic device 800 may include an antenna system 846 and a cellular and/or Wi-Fi transceiver 842 (e.g., multi-band with transceivers 843 and 845). Wireless communication protocols may include, but are not limited to, IEEE 802.11a, 802.11b, 802.11g, 802.11n, 802.11ac, Bluetooth® protocols, IEEE 802.15 protocols, near field communication (NFC) protocols, RFID protocols and/or any other wireless local area network protocols.

Electronic device 800 may also include other various components, such as a processor 851, a memory 853, display 854, keypad 852, speaker 856, microphone 850 and/or camera 858. Some embodiments provide that the display 854 may include a touch sensitive display or screen, or the like.

The memory 853 stores software that may be executed by the processor 851, and may include one or more erasable programmable read-only memories (EPROM or Flash EPROM), battery backed random access memory (RAM), magnetic, optical, or other digital storage device, and may be separate from, or at least partially within, the processor 851. The processor 851 may include more than one processor, such as, for example, a general purpose processor and a digital signal processor, which may be enclosed in a common package or separate and apart from one another. In particular, the processor 851 may be configured to control various functions of electronic device 800, including receiving input from a touch sensitive screen or other sensors.

Electronic device 800 may communicate with a base station of a network using radio frequency signals, which may be communicated through antenna system 846. For example, electronic device 800 may be configured to communicate via the cellular transceiver 842 using one or more cellular communication protocols such as, for example, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and/or Universal Mobile Telecommunications System (UMTS), among others. Communication protocols as used herein may specify the information communicated, the timing, the frequency, the modulation, and/or the operations for setting-up and/or maintaining a communication connection. In some embodiments, the antenna system 846 may be a single antenna. Cellular protocols may be used to communicate via a radio base station with other computing devices, including an application server such as application server 320, when a mobile device is in application online mode. Cellular protocols may be used to communicate via a radio base station with computing devices other than application server 320 when a mobile device is in application offline mode.

It is to be understood that the present invention is not limited to the particular configurations shown in FIGS. 3-8, but is intended to encompass any configuration capable of carrying out operations described herein. While particular functionalities are shown in particular blocks by way of illustration, functionalities of different blocks and/or portions thereof may be combined, divided, and/or eliminated. Moreover, the functionality of the hardware/software architecture may be implemented as a single processor system or a multi-processor system in accordance with various embodiments of the present invention.

The embodiments described herein provide various advantages. Battery power may be saved. Security and privacy may be increased. Network bandwidth may be used more efficiently.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A mobile communication terminal, the mobile communication terminal comprising:
   a processor;
   a communication interface coupled to the processor; and
   a memory coupled to the processor and comprising computer readable program code embodied in the memory that when executed by the processor causes the processor to perform operations comprising:
      receiving a wireless transmission from a tag;
      storing data received from the tag and a timestamp of the wireless transmission, wherein the storing is performed while the mobile communication terminal is in an application offline mode with respect to communication with a server configured to receive the data and timestamp;
      determining that another computing device is in an application online mode capable of presently communicating with the server; and
      sending the data and the timestamp in a tag transmission report to the another computing device responsive to the determining that the another computing device is in the application online mode capable of presently communicating with the server, wherein the sending is performed while the mobile communication terminal is in the application offline mode.

2. The mobile communication terminal of claim 1, wherein while operating in the application offline mode, the mobile communication terminal is not capable of sending the tag transmission report to the server through cellular and/or wide area networks (WAN).

3. The mobile communication terminal of claim 1, wherein while operating in the application offline mode, the mobile communication terminal prevents application communication with the server through cellular and/or wide area networks (WAN).

4. The mobile communication terminal of claim 3, wherein the application offline mode comprises continuing application communication with other computing devices through at least one of local area networks (LAN), Wi-Fi, Bluetooth® protocols and near field communication (NFC).

5. The mobile communication terminal of claim 1, wherein the operations further comprise broadcasting a notification transmission indicating that the mobile communication terminal has the tag transmission report to send to the another computing device that is in the application online mode.

6. The mobile communication terminal of claim 1, wherein the operations further comprise:
   listening for a broadcast transmission from the another computing device indicating that the another computing device is in the application online mode; and
   responsive to receiving the broadcast transmission, sending the tag transmission report to the another computing device.

7. The mobile communication terminal of claim 1, wherein the another computing device is a first another computing device, and wherein the operations further comprise:
   sending the data and the timestamp in another tag transmission report to a second another computing device responsive to a determination that the second another computing device is in the application online mode with respect to the server.

8. The mobile communication terminal of claim 7, wherein the operations further comprise:
   establishing a counter value associated with the data and the timestamp responsive to sending the tag transmission report;
   changing the counter value responsive to sending the another tag transmission report; and
   responsive to the counter value satisfying a counter threshold, preventing the sending of the tag transmission report or the another tag transmission report to the server.

9. The mobile communication terminal of claim 1, wherein the operations further comprise:
   storing a geographical location of the mobile communication terminal responsive to receiving the wireless transmission from the tag; and
   sending the geographical location in the tag transmission report to the another computing device.

10. The mobile communication terminal of claim 9, wherein the wireless transmission is a first wireless transmission and the timestamp is a first timestamp, and wherein the operations further comprise:
    receiving a second wireless transmission from the tag of the first wireless transmission, the second wireless transmission comprising a second timestamp that is different from the first timestamp; and
    overwriting the first timestamp with the second timestamp responsive to a determination that the first wireless transmission and the second wireless transmission were received from the same tag and that a current geographical location of the mobile communication terminal is the same as the stored geographical location.

11. The mobile communication terminal of claim 1, wherein the operations further comprise performing at least one of deleting the data and sending the tag transmission report to the server responsive to a determination that a storage time of the data satisfies an expiration threshold.

12. A method, comprising:
    receiving a wireless transmission from a tag;
    storing, by a mobile communication terminal, data received from the tag and a timestamp of the wireless transmission, wherein the storing is performed while the mobile communication terminal is in an application offline mode with respect to communication with a server configured to receive the data and timestamp;
    determining, by the mobile communication terminal, that another computing device is in an application online mode capable of presently communicating with the server; and
    sending the data and the timestamp in a tag transmission report to the another computing device responsive to the determining that the another computing device is in the application online mode capable of presently communicating with the server, wherein the sending is performed while the mobile communication terminal is in the application offline mode.

13. The method of claim 12, wherein while operating in the application offline mode, the mobile communication terminal is not capable of sending the tag transmission report to the server through cellular and/or wide area networks (WAN).

14. The method of claim 12, wherein while operating in the application offline mode, the mobile communication terminal prevents application communication with the server through cellular and/or wide area networks (WAN).

15. The method of claim 12, wherein storing comprises storing a geographical location of the mobile communication terminal responsive to receiving the wireless transmission from the tag, and wherein sending comprises sending the geographical location in the tag transmission report to the another computing device.

16. The method of claim 12, wherein the another computing device is a first another computing device, and wherein the method further comprises:
sending the data and the timestamp in another to transmission report to a second another computing device responsive to a determination that the second another computing device is in the application online mode with respect to the server.

17. The method of claim 16, further comprising:
establishing a counter value associated with the data and the timestamp responsive to sending the tag transmission report; and
changing the counter value responsive to sending the another tag transmission report; and
responsive to the counter value satisfying a counter threshold, preventing the sending of the tag transmission report or the another tag transmission report to the server.

18. A computing device comprising:
a processor;
a communication interface coupled to the processor; and
a memory coupled to the processor and comprising computer readable program code embodied in the memory that when executed by the processor causes the processor to perform operations comprising:
sending an online notification indicating that the computing device is in an application online mode capable of presently communicating with a server;
receiving an offline notification from another computing device indicating that the another computing device is in an application offline mode with respect to communication with the server;
receiving a tag transmission report from the another computing device, wherein the tag transmission report comprises data received in a wireless transmission from a tag and a timestamp of the wireless transmission; and
sending the tag transmission report to the server.

19. The computing device of claim 18, further comprising sending a confirmation message to the another computing device responsive to receiving the tag transmission report from the another computing device.

20. The computing device of claim 19, further comprising sending another confirmation message to the another computing device responsive to sending the tag transmission report to the server.

* * * * *